US012647286B2

(12) United States Patent
Park

(10) Patent No.: US 12,647,286 B2
(45) Date of Patent: Jun. 2, 2026

(54) AUTHORITY AUTHENTICATION SYSTEM FOR ELECTRONIC DEVICE AND METHOD OF OPERATING SAME

(71) Applicant: Samsung Electronics Co., Ltd.,
Suwon-si (KR)

(72) Inventor: Sohyun Park, Suwon-si (KR)

(73) Assignee: Samsung Electronics Co., Ltd.,
Gyeonggi-do (KR)

( * ) Notice: Subject to any disclaimer, the term of this patent is extended or adjusted under 35 U.S.C. 154(b) by 51 days.

(21) Appl. No.: 18/626,779

(22) Filed: Apr. 4, 2024

(65) Prior Publication Data

US 2025/0119304 A1      Apr. 10, 2025

(30) Foreign Application Priority Data

Oct. 6, 2023    (KR) ........................ 10-2023-0133799

(51) Int. Cl.
H04L 9/32      (2006.01)
H04L 9/08      (2006.01)
(52) U.S. Cl.
CPC .......... H04L 9/3268 (2013.01); H04L 9/0825 (2013.01); H04L 9/3265 (2013.01)
(58) Field of Classification Search
CPC .... H04L 9/3268; H04L 9/3265; H04L 9/0825
USPC ........................................ 713/157
See application file for complete search history.

(56) References Cited

U.S. PATENT DOCUMENTS

| | | | |
|---|---|---|---|
| 11,516,256 B2 | 11/2022 | Ponnuru et al. | |
| 2022/0123921 A1 | 4/2022 | Chu | |
| 2022/0222325 A1 | 7/2022 | Ponnuru et al. | |
| 2023/0179418 A1 | 6/2023 | Noh et al. | |
| 2024/0073033 A1* | 2/2024 | Chu | H04L 63/126 |
| 2024/0146536 A1* | 5/2024 | Das | H04L 9/3213 |
| 2024/0305633 A1* | 9/2024 | Paulraj | H04L 63/0823 |
| 2024/0313983 A1* | 9/2024 | Ponnuru | H04L 9/3268 |

FOREIGN PATENT DOCUMENTS

| | | |
|---|---|---|
| CN | 106326754 A | 1/2017 |
| CN | 107908574 A | 4/2018 |
| CN | 109101829 A | 12/2018 |
| KR | 10-0986047 B1 | 10/2010 |
| KR | 10-1873991 B1 | 7/2018 |

* cited by examiner

*Primary Examiner* — Zi Ye

(74) *Attorney, Agent, or Firm* — Harness, Dickey & Pierce, P.L.C.

(57)      ABSTRACT

An authority authentication system includes an electronic device configured to generate a first unique asymmetric key pair, including a first public key and a first private key, a certificate authority server configured to generate a unique asymmetric key certificate and a unique certificate chain, and inject the unique certificate chain into the electronic device, at least one owner terminal device configured to request authority authentication from the electronic device based on at least one owner certificates and at least one owner key pair corresponding to the at least one owner terminal device, the at least one owner key pair including at least one public owner key and at least one private owner key, a communication network including a secure communication channel configured to transmit and receive the at least one owner certificate and the at least one public owner key.

20 Claims, 9 Drawing Sheets

1310_1

1310_1

AUTHORITY AUTHENTICATION SYSTEM FOR ELECTRONIC DEVICE AND METHOD OF OPERATING SAME

CROSS-REFERENCE TO RELATED APPLICATIONS

This U.S. non-provisional application claims the benefit of priority under 35 U.S.C. § 119 to Korean Patent Application No. 10-2023-0133799 filed on Oct. 6, 2023, in the Korean Intellectual Property Office, the disclosure of which is incorporated by reference herein in its entirety.

BACKGROUND

Various example embodiments of the inventive concepts described herein relate to an authority authentication system for an electronic device, an authority authentication device, a method of operating the authority authentication system, and/or a non-transitory computer readable medium including computer readable instructions related to operating the authority authentication system.

Recently, security authentication technology for storage devices, such as solid state drives (SSDs), etc., has been developed. For example, technology for performing security authentication using a virtual key that digitizes the access authority of a user has been developed. In this case, an electronic device verifies the certificate (e.g., security certificate, etc.) of a user terminal device based on the virtual key and grants authority for the electronic device to the user terminal device. The related art uses a scheme of granting authority for an electronic device to a user terminal and authenticating the user terminal under the leadership of a certification authority (CA). For example, this is a scheme in which one certification authority (CA) generates and/or authenticates a whitelist of each of a plurality of electronic devices. In this case, the whitelist refers to user terminal devices that have access authority to an electronic device. When such an authority authentication scheme is used, it takes a considerable amount of time and cost for the CA to manage a secret value and/or a secret key of the whitelist. In addition, in such an authority authentication scheme, authentication information may be leaked from the authentication authority, e.g., the CA, etc., due to various types of hacking. Therefore, there is a desire and/or need to provide a system that improves and/or simplifies the process of verifying a user terminal device and improves and/or increases the reliability of security authentication.

SUMMARY

Various example embodiments of the inventive concepts provide a system for authenticating the authority of an owner terminal device for an electronic device, an authority authentication device, a method of operating the authority authentication system, and/or a non-transitory computer readable medium including computer readable instructions related to operating the authority authentication system.

According to at least one example embodiment, an authority authentication system includes an electronic device configured to generate a first unique asymmetric key pair, including a first public key and a first private key, a certificate authority server configured to generate a unique asymmetric key certificate and a unique certificate chain, and inject the unique certificate chain into the electronic device, at least one owner terminal device configured to request authority authentication from the electronic device based on at least one owner certificates and at least one owner key pair corresponding to the at least one owner terminal device, the at least one owner key pair including at least one public owner key and at least one private owner key, and a communication network including a secure communication channel configured to transmit and receive the at least one owner certificate and the at least one public owner key, wherein the electronic device is further configured to, form an authority certificate chain including the unique certificate chain and the at least one owner certificate, and change the authority certificate chain based on authentication of an authority of the owner terminal device.

According to at least one example embodiment, an electronic device includes memory including at least one slot configured to store a unique certificate chain including a unique asymmetric key certificate, and processing circuitry configured to generate a unique identifier associated with the electronic device, generate a unique asymmetric key pair based on the unique identifier, the unique asymmetric key pair including a first public key and a first private key, and verify the unique certificate chain based on the first private key.

According to at least one example embodiment, an authority authentication method includes generating, using processing circuitry, a unique asymmetric key pair, the unique asymmetric key pair including a first public key and a first private key, transmitting, using the processing circuitry, the first public key to a certificate authority server, receiving, using the processing circuitry, a unique certificate chain including a unique asymmetric key certificate generated based on the first public key, receiving, using the processing circuitry, an authority authentication request from an owner terminal device, the authority authentication request including an owner certificate and a public owner key associated with the owner terminal device, forming, using the processing circuitry, an authority certificate chain including the owner certificate and the unique certificate chain, and changing, using the processing circuitry, the authority certificate chain in response to results of the authority authentication request.

The authority authentication system, device, method of operating the same, and/or non-transitory medium according to various example embodiments of the inventive concepts may efficiently manage authority-authenticated owner terminal devices and improve the reliability of security authentication.

BRIEF DESCRIPTION OF THE FIGURES

The above and other objects and features of the inventive concepts will become apparent by describing in detail example embodiments thereof with reference to the accompanying drawings.

3

Figure 1:
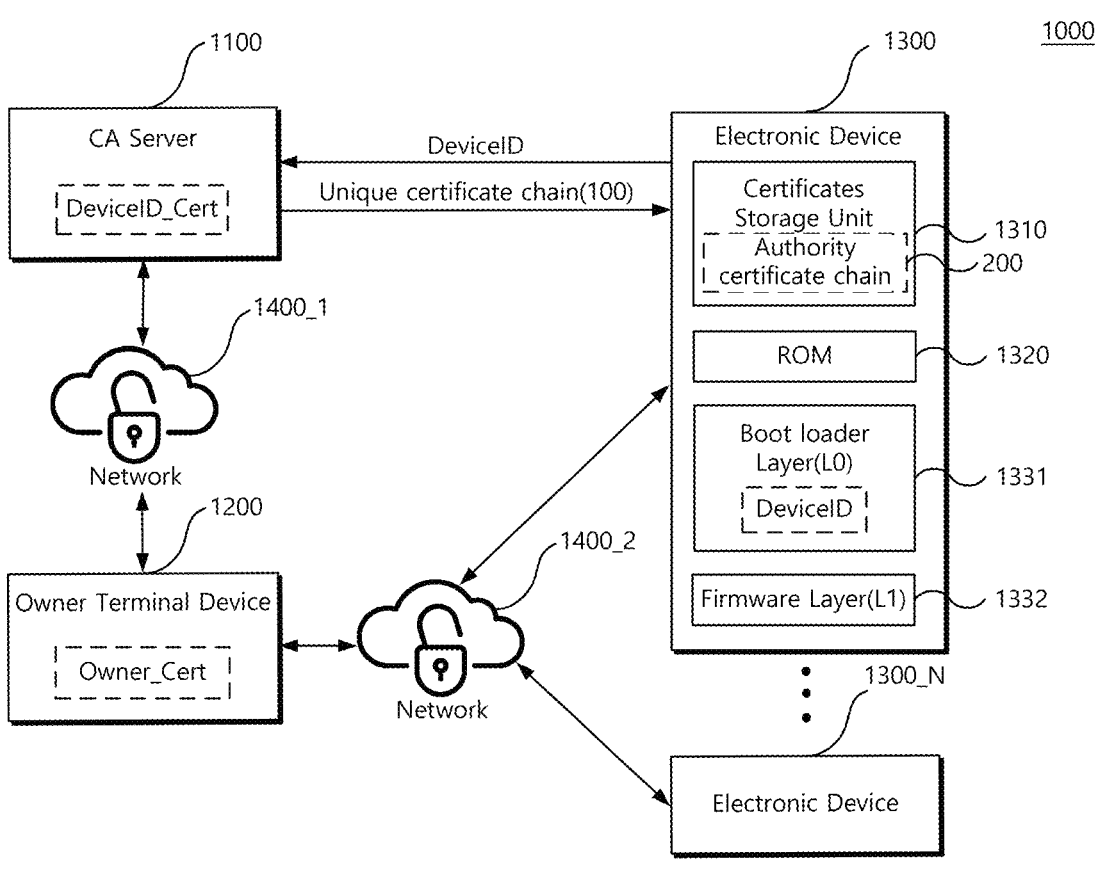
FIG. 1 is a block diagram illustrating an authority authentication system 1000 according to at least one example embodiment of the inventive concepts.
Figure 5A:
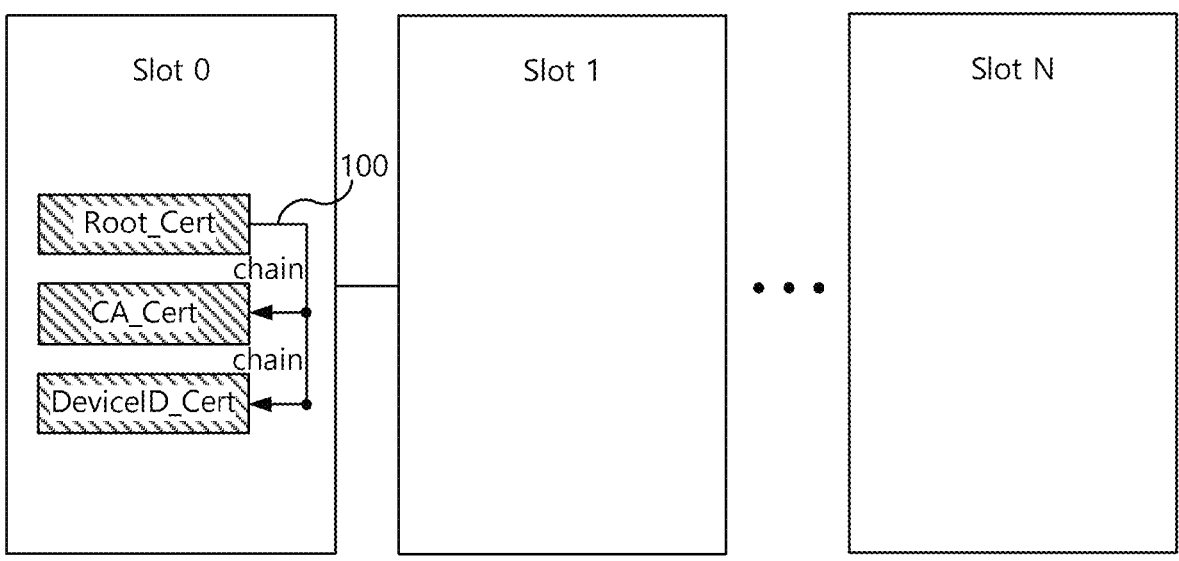
Figure 5B:
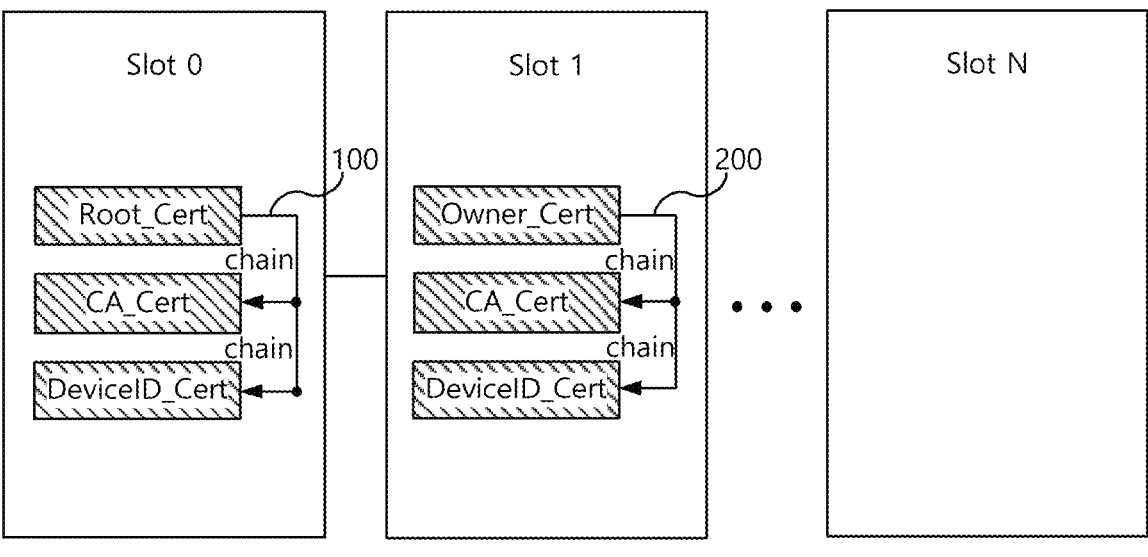
Figure 6:
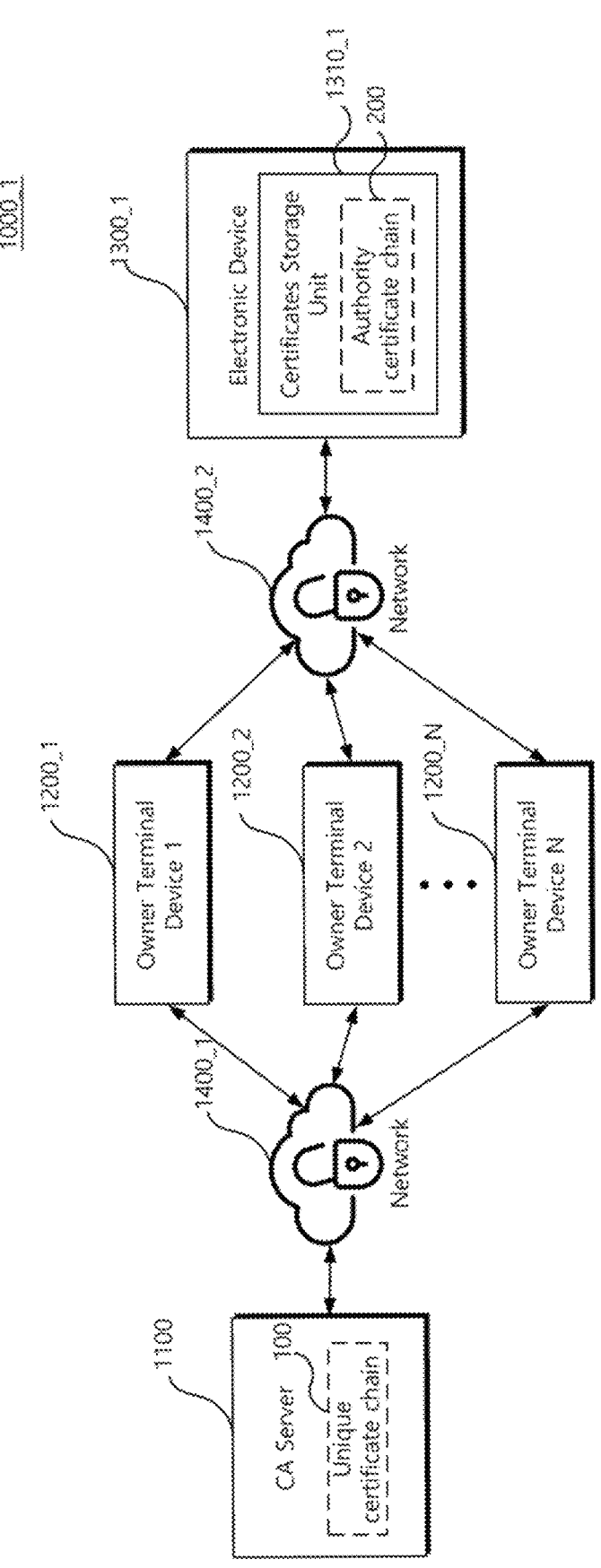
Figure 7:
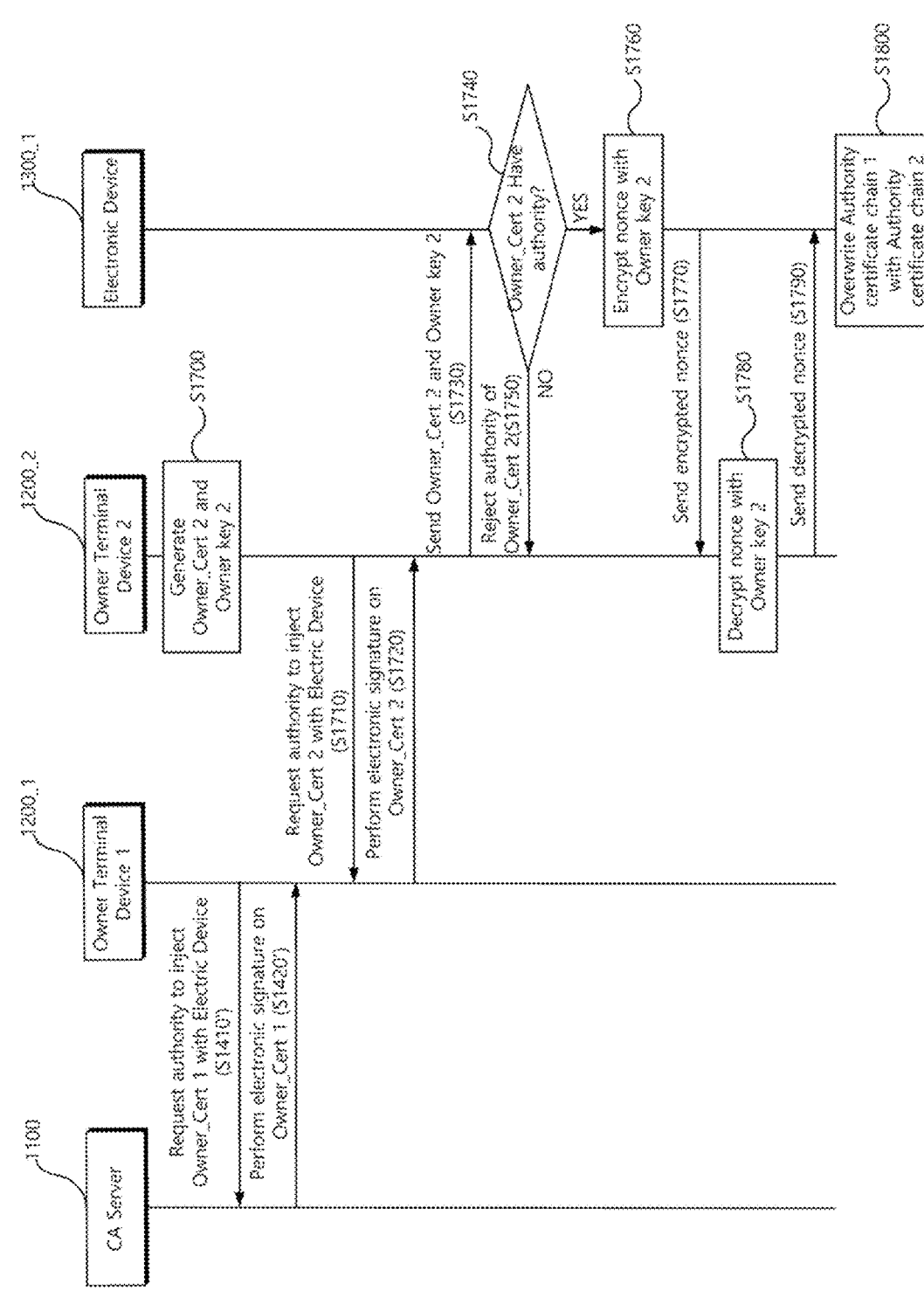
Figure 8A:
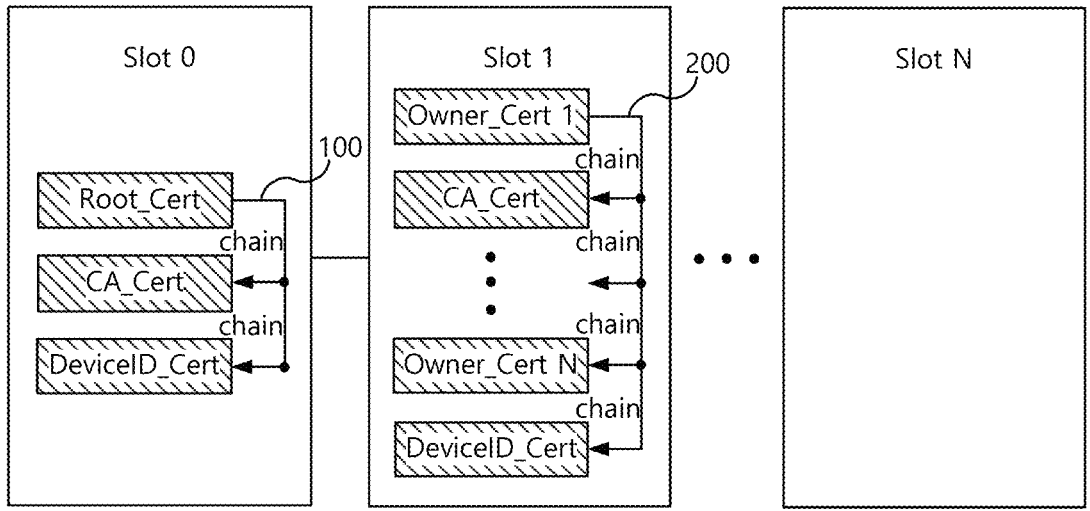
Figure 8B:
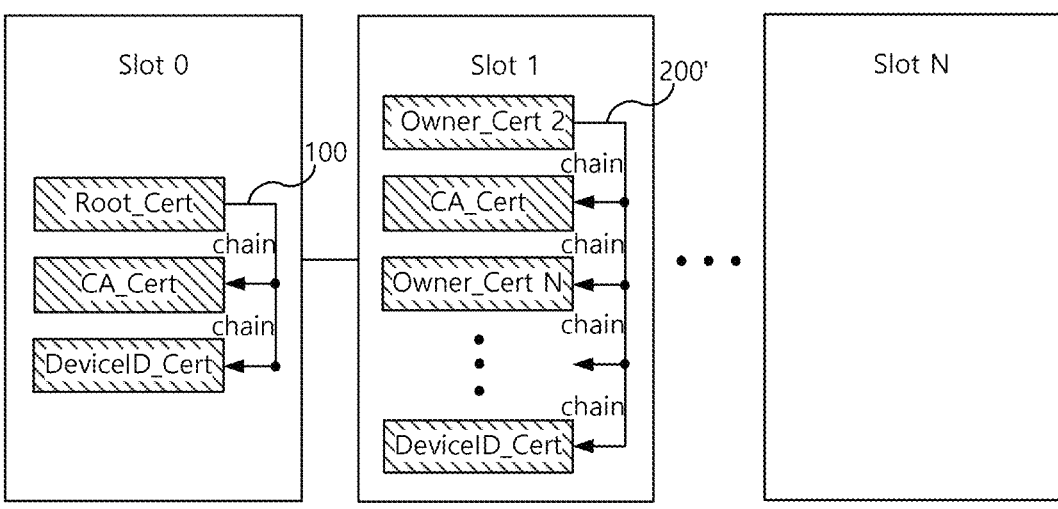
Figure 9A:
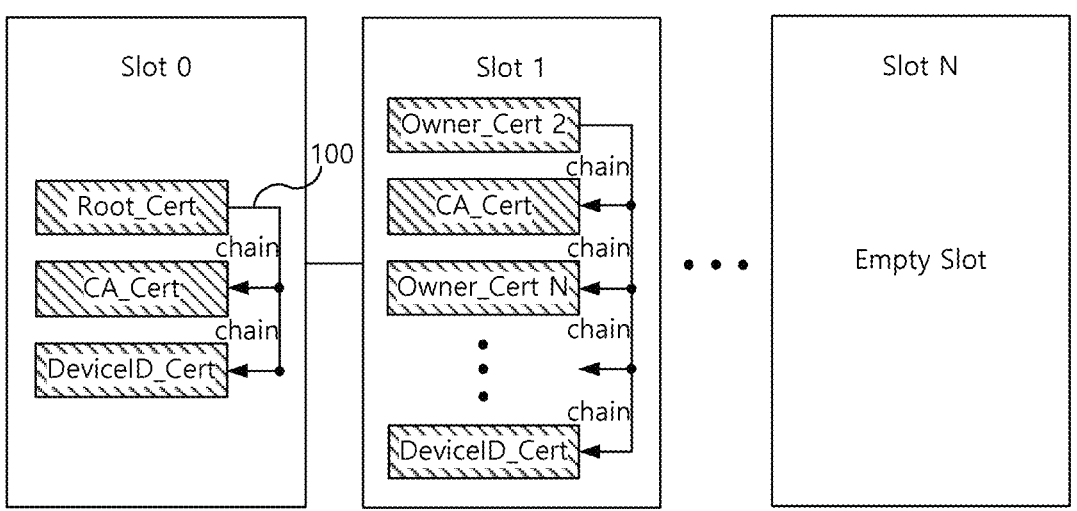
Figure 9B:
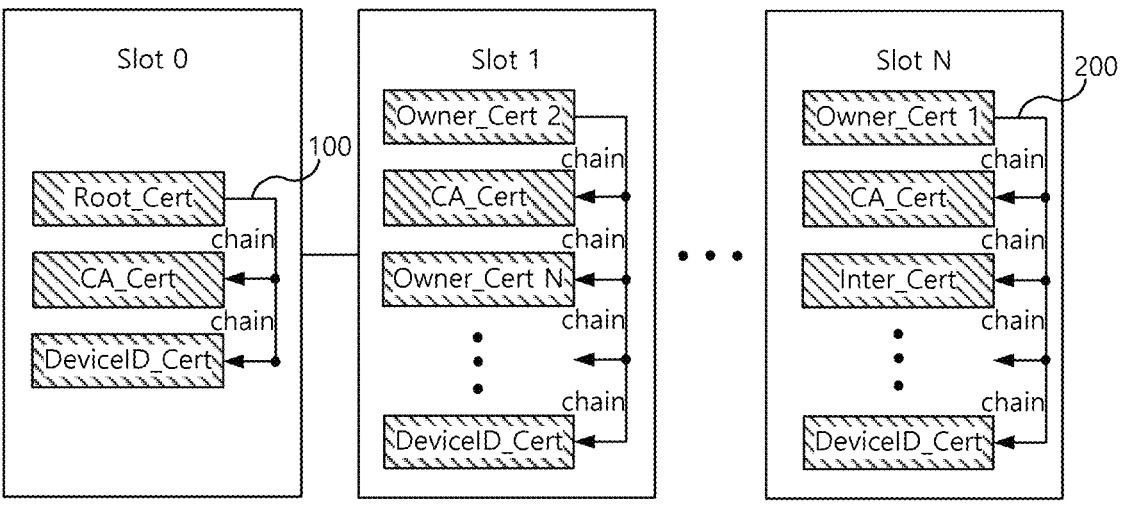

FIGS. 5A and 5B are diagrams illustrating an example of the certificate storage unit 1310 of the electronic device 1300 of FIG. 1 according to at least one example embodiment;

FIG. 6 is a diagram illustrating another example of the authority authentication system 1000 of FIG. 1 according to at least one example embodiment;

FIG. 7 is a flowchart illustrating another example of the operation of the authority authentication system 1000_1 of FIG. 6 according to at least one example embodiment;

FIGS. 8A and 8B are diagrams illustrating another example of the certificate storage unit 1310_1 of FIG. 6 according to at least one example embodiment; and FIGS. 9A and 9B are diagrams illustrating still another example of the certificate storage unit 1310_1 of FIG. 6 according to at least one example embodiment.

DETAILED DESCRIPTION

Hereinafter, various example embodiments of the inventive concepts will be described clearly and in detail so that those of ordinary skill in the art can easily carry out example embodiments of the inventive concepts.

FIG. 1 is a block diagram illustrating an authority authentication system 1000 according to at least one example embodiment of the inventive concepts.

The authority authentication system 1000 according to at least one example embodiment of the inventive concepts may grant authority (e.g., access authority, etc.) for a plurality of electronic devices 1300 to one or more owner terminal devices 1200. The authority authentication system 1000 may follow the security protocols and data models (SPDM) standard, which is a security standard protocol, but is not limited thereto. For example, according to the SPDM standard, the owner terminal device 1200 may perform a SET_CERTIFICATE request and then inject a certificate (e.g., security certificate, etc.) into the electronic device 1300. The SET_CERTIFICATE request is message information issued for certificate injection. The SPDM standard does not describe a scheme for verifying the authority of the owner terminal device 1200 (Out of Scope), but the authority authentication system 1000 of at least one example embodiment of the inventive concepts may supplement it. However, the usage of the SPDM standard is only illustrative and example embodiments are not limited thereto and, for example, may use different standards.

The electronic device 1300 according to at least one example embodiment of the inventive concepts may verify the authority (e.g., access authority) of the owner terminal device 1200, and according to and/or based on the verification result, the owner terminal device 1200 may inject (e.g., transmit, send, store, etc.) a certificate (e.g., security certificate, etc.) into the electronic device 1300.

Describing in more detail with reference to FIG. 1, the authority authentication system 1000 includes a certificate authority server 1100, the owner terminal device 1200, the electronic device 1300, and/or a plurality of communication networks, such as communication network 1400_1 and 1400_2, etc., but the example embodiments are not limited thereto, and for example, the authority authentication system 1000 may include a greater or lesser number of constituent components.

The certificate authority server 1100 may be a server of an authority that issues digital certificates and manages electronic signatures and encryption. Alternatively, and/or additionally, the certificate authority server 1100 may be a certificate authority (CA) server of the manufacturer of the electronic device 1300, etc. For example, the certificate authority server 1100 may be a server of a trusted entity as well as a manufacturer's server, but the example embodiments are not limited thereto.

The certificate authority server 1100 may receive a unique asymmetric key DeviceID from the electronic device 1300, but is not limited thereto. In addition, the certificate authority server 1100 may generate a unique asymmetric key certificate DeviceID_Cert based on the unique asymmetric key DeviceID. For example, during manufacturing and/or production of the electronic device 1300, the certificate authority server 1100 may generate a certificate based on the unique asymmetric key DeviceID, which is unique information to the electronic device 1300, such as a unique identifier, etc., associated with the electronic device 1300. For example, the certificate DeviceID_Cert may be unique information called a unique certificate, a unique information certificate, and/or a unique asymmetric key certificate, etc.

In at least one example embodiment of the inventive concepts, it is assumed that all certificates described later include information, such as an electronically signed public key, certification authority signature information, certificate issuer information, certificate issue target, identifier information, and the like. By encrypting information about authenticated attributes included in the certificate, certificate signature information may be generated.

The unique asymmetric key DeviceID may be an asymmetric key implemented in a form embedded in the electronic device 1300, but is not limited thereto. For example, the certificate authority server 1100 may receive a public key of the unique asymmetric key DeviceID. Then, the certificate authority server 1100 may generate the unique asymmetric key certificate DeviceID_Cert based on the public key of the unique asymmetric key DeviceID. The unique asymmetric key certificate DeviceID_Cert may include the unique information and the public key of the unique asymmetric key DeviceID, etc.

In addition, the certificate authority server 1100 may form and/or generate a unique certificate chain 100 based on the electronic signature of the unique asymmetric key certificate DeviceID_Cert. For example, the unique certificate chain 100 may be formed as a 3-layer certificate chain, but is not limited thereto, and the certificate chain may have a greater or lesser number of layers. The certificate chain of the certificate authority server 1100 may be formed in a chain of trust (CoT) structure, etc. However, this is an example, and the example embodiments of the inventive concepts are not limited thereto.

The electronic device 1300 may generate the unique asymmetric key DeviceID. For example, the unique asymmetric key DeviceID may use two keys as a key pair by using an asymmetric encryption algorithm. In this case, the two keys of the key pair are referred to as a public key and a secret key (e.g., private key). The data encrypted with the secret key may be decrypted with the public key.

Then, the electronic device 1300 may transmit the generated unique asymmetric key DeviceID to the certificate authority server 1100. Then, as described above, the certificate authority server 1100 may generate the unique asymmetric key certificate DeviceID_Cert based on the unique asymmetric key DeviceID. In addition, the certificate authority server 1100 may transmit the unique asymmetric key certificate DeviceID_Cert to the electronic device 1300. In this case, it is assumed that the electronic device 1300 has and/or receives the public key information of the certificate authority server 1100.

The electronic device 1300 may include a certificate storage unit 1310 (e.g., certificate storage device, etc.), a read-only-memory (ROM) 1320, a boot loader layer 1331, and/or a firmware layer 1332, etc., but is not limited thereto, and for example, may include at least one processor (not shown), etc. The electronic device 1300 may be implemented to include a plurality of layers. For example, as shown in FIG. 1, the plurality of layers may include the ROM 1320, the boot loader layer 1331, and the firmware layer 1332. However, this is an example, and the electronic device 1300 may be implemented to further include additional layers other than the boot loader layer 1331 and the firmware layer 1332. According to some example embodiments, the at least one processor, the certificate storage unit 1310, the ROM 1320, the boot loader layer 1331, and/or the firmware layer 1332, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The certificate storage unit 1310 may form, generate, and/or store an authority certificate chain 200 including a unique certificate chain 100 and an owner certificate Owner-_Cert, etc. In addition, the certificate storage unit 1310 may transmit the authority certificate chain 200 to the firmware layer 1332.

The ROM 1320, the boot loader layer 1331, and the firmware layer 1332 may be generated based on the device identifier composition engine (DICE) standard, but the example embodiments are not limited thereto. For example, as specified in the DICE standard, the unique asymmetric key DeviceID may be generated and stored in the boot loader layer 1331. The ROM 1320, boot loader layer 1331, and firmware layer 1332 of the electronic device 1300 may correspond to the Root of Trust ROT, layer 0 L0, and layer 1 L1 according to the DICE standard, respectively. However, this is an example, and the example embodiments of the inventive concepts are not limited thereto.

The DICE standard, which is one of the security solutions, is a cryptographic ID technology of the international security standards organization Trusted Computing Group (TCG). The electronic device 1300 according to at least one example embodiment of the inventive concepts may be implemented to comply with the DICE standard, and thus security may be enhanced and/or improved. The electronic device 1300 according to and/or based on the DICE standard may support device authentication technology. For example, the ROM 1320 according to and/or based on the DICE standard may store computer readable instructions, which when executed by the processing circuitry, cause the processing circuitry to generate a unique cryptographic identifier CDI, which is unique information of the electronic device and/or the ROM 1320 may store the unique cryptographic identifier CDI, etc.

The computer readable instructions stored in the ROM 1320, when executed by the processing circuitry, may cause the processing circuitry to generate a unique identifier CDI based on unique information of the electronic device 1300, and/or the ROM 1320 may store unique identifier CDI which was generated based on unique information of the electronic device 1300. In addition, the unique identifier CDI stored in the ROM 1320 may be transmitted by the processing circuitry to the boot loader layer 1331.

The boot loader layer 1331 may generate the unique asymmetric key DeviceID based on the received unique identifier CDI. In addition, the boot loader layer 1331 may transmit the unique asymmetric key DeviceID to the firmware layer 1332. Then, the firmware layer 1332 may transmit the unique asymmetric key DeviceID to the certificate authority server 1100.

The firmware layer 1332 may verify the authority certificate chain 200. For example, the firmware layer 1332 may receive the authority certificate chain 200 from the certificate storage unit 1310. Then, the firmware layer 1332 may verify the authority certificate chain 200 with the secret key of the received asymmetric key DeviceID. The validity of the authority certificate chain 200 may be determined according to and/or based on the verification result achieved in the firmware layer 1332.

The owner terminal device 1200 may communicate with the certificate authority server 1100 through the communication network 1400_1 and with the electronic device 1300 through the communication network 1400_2. The owner terminal device 1200 may include at least one of various computing devices, such as a smartphone, laptop PC, and/or desktop PC, etc., but is not limited thereto.

It is assumed that the owner terminal device 1200 is a device that has already established a trust relationship with the certificate authority server 1100, or in other words, the owner terminal device 1200 has already been verified and/or authenticated with the certificate authority server 1100.

The owner terminal device 1200 may request authority authentication from the certificate authority server 1100 and the electronic device 1300 through communication networks 1400_1 and 1400_2. At the same time, the owner terminal device 1200 may transmit an owner certificate Owner_Cert and/or an owner key to the certificate authority server 1100 and the electronic device 1300. In this case, the operation of requesting authority authentication is an operation of requesting authority (e.g., access authority, etc.) for the electronic device 1300 to be granted to the owner terminal device 1200. Alternatively, and/or additionally, the operation of requesting authority authentication is an operation of injecting (e.g., transmitting, storing, etc.) the owner certificate Owner_Cert of the owner terminal device 1200 into the electronic device 1300. Then, the certificate authority server 1100 may respond by electronically signing the owner certificate Owner_Cert. For example, the certificate authority server 1100 may electronically sign the owner certificate Owner_Cert for the public key of the asymmetric key DeviceID. According to an example embodiment, the certificate authority server 1100 may electronically sign the owner certificate Owner_Cert for the public key of the asymmetric key DeviceID, using a private key of the certificate authority server 1100, but the example embodiments are not limited thereto.

When the owner terminal device 1200 requests authority authentication for the electronic device 1300, the owner certificate Owner_Cert may be transmitted to the electronic device 1300. In this case, the owner certificate Owner_Cert is a certificate electronically signed by the certificate authority server 1100. Then, the electronic device 1300 may determine whether the owner certificate Owner_Cert is authorized (e.g., valid, authentic, etc.) by the certificate authority server 1100. According to the determination result, the owner terminal device 1200 may inject (e.g., store, etc.) the owner certificate Owner_Cert into the electronic device 1300.

As a more specific example, the owner terminal device 1200 may provide a certificate signing request (CSR) for the owner certificate Owner_Cert to the certificate authority server 1100 through the communication network 1400_1. Then, the certificate authority server 1100 may electronically sign the owner certificate Owner_Cert of the owner terminal device 1200 in response to the certificate signing request (CSR). In addition, the owner terminal device 1200 may request authority authentication of the owner certificate Owner_Cert and/or the owner terminal device 1200 by the electronic device 1300 through the communication network 1400_2. At the same time, the owner terminal device 1200 may transmit the electronically signed owner certificate Owner_Cert to the electronic device 1300 through the communication network 1400_2. Then, the electronic device 1300 may check, validate, and/or authenticate, etc., whether the owner certificate Owner_Cert is authorized in response to the authorization request. For example, the electronic device 1300 may determine whether the authority of the owner terminal device 1200 is authorized based on the unique asymmetric key certificate DeviceID_Cert, but is not limited thereto. When the electronic device 1300 determines that the owner terminal device 1200 is authorized, the owner terminal device 1200 may claim ownership of and/or begin accessing the electronic device 1300. In this case, the ownership refers to having the authority to inject (e.g., store) a certificate into the electronic device 1300, etc.

When the electronic device 1300 grants authority to the owner terminal device 1200, a trusted entity other than the highest level certification authority (e.g., a Root CA, etc.) cannot delete the owner certificate Owner_Cert stored in the electronic device 1300. For example, while the authority certificate chain 200 stored in the electronic device 1300 is valid, the certification authority cannot delete the owner certificate Owner_Cert. In other words, when the electronic device 1300 grants authority to the owner terminal device 1200, other parties, such as the manufacturer, etc., cannot delete (e.g., is prohibited from deleting, etc.) the owner certificate Owner_Cert stored in the electronic device 1300, or in other words, the manufacturer and/or other entity that is not the Root CA, cannot revoke permission of the owner terminal device 1200 to access the electronic device 1300, etc.

The communication networks 1400_1 and 1400_2 may be wired and/or wireless networks capable of transmitting and receiving authority authentication requests and certificates, but is not limited thereto. For example, the communication networks 1400_1 and/or 1400_2 may include wired Ethernet, wired LAN, wireless LAN, Wi-Fi, Bluetooth, zigbee, Wi-Fi Direct (WFD), ultra wideband (UWB), infrared communication (IrDA), infrared data association (IrDA), Bluetooth low energy (BLE), near field communication (NFC), and the like, but the example embodiments are not limited thereto. For example, the communication networks 1400_1 and 1400_2 may include one or more arbitrary networks of a personal area network (PAN), a local area network (LAN), a campus area network (CAN), metropolitan area network (MAN), a wide area network (WAN), and broadband network (BBN), the Internet, and the like, but the example embodiments are not limited thereto. According to some example embodiments, the communication networks 1400_1 and 1400_2 may be combined into a single communication network, or may be split into three or more communication networks, etc.

In this case, the communication networks 1400_1 and 1400_2 may each include at least one secure communication channel. For example, the secure communication channel may generate secure communication sessions (e.g., encrypted communication sessions, etc.) that follow a security standard protocol such as SPDM, etc., but the example embodiments are not limited thereto.

In the authority authentication system 1000 according to at least one example embodiment of the inventive concepts, the electronic device 1300 may directly perform authority authentication of the owner terminal device 1200. Accordingly, even without receiving information directly from the certificate authority server 1100, the electronic device 1300 may block, stop, prohibit, etc., a request from an unauthorized owner terminal device 1200. Additionally, even without receiving information directly from the certificate authority server 1100, the electronic device 1300 may authorize the owner terminal device 1200 to access the electronic device 1300, etc. In other words, the certificate authority server 1100 does not need to manage the list and secret keys of the owner terminal devices 1200 which have access authority to the electronic device 1300, etc. In addition, the electronic device 1300 may easily grant authority (e.g., access authority, etc.) to the owner terminal device 1200. Therefore, the authority authentication system 1000 according to at least one example embodiment of the inventive concepts may complement and/or improve the authority authentication scheme of, e.g., the SPDM standard, and may provide improved security reliability, improved efficiency, improved uptime, etc., for authority authentication of the owner terminal device 1200.

Figure 2:
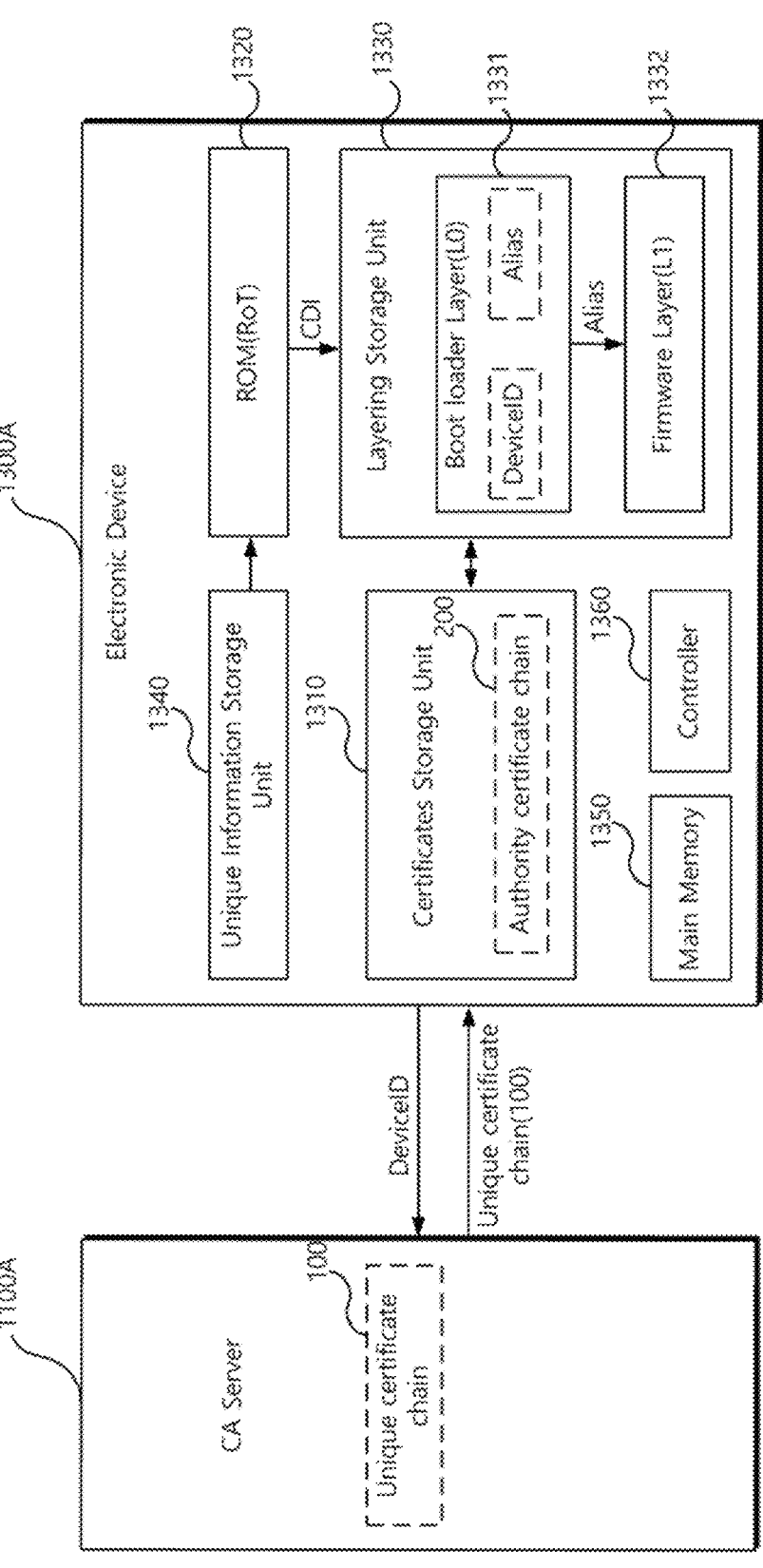
FIG. 2 is a block diagram illustrating in more detail an example of the electronic device 1300 of FIG. 1 implemented in hardware according to at least one example embodiment.

FIG. 2 is a block diagram illustrating in more detail an example of the electronic device 1300 of FIG. 1 implemented in hardware according to at least one example embodiment. A certificate authority server 1100A and an electronic device 1300A illustrated in FIG. 2 are similar to the certificate authority server 1100 and the electronic device 1300 of FIG. 1. Accordingly, identical or similar components are denoted by identical or similar reference numerals, and overlapping descriptions will be omitted hereinafter.

Referring to FIG. 2, the certificate authority server 1100 may receive the unique asymmetric key DeviceID from the electronic device 1300. Then, the certificate authority server 1100 may generate the unique asymmetric key certificate DeviceID_Cert based on the received unique asymmetric key DeviceID. However, this is an example, and the example embodiments of the inventive concepts are not limited thereto.

For the sake of clarity and brevity, the certificate authority server 1100 has been described as forming and/or generating the three-layer unique certificate chain 100, but the example embodiments of the inventive concepts are not limited thereto. As another example, the certificate authority server 1100A may form and/or generate a unique certificate chain 100 of N layers (where N is a natural number of 2 or more). In this case, the unique asymmetric key certificate DeviceID_Cert may be a leaf certificate of the unique certificate chain 100, but is not limited thereto. Additionally, the certificate chain may be formed based on a signature, but is not limited thereto. For example, a CA certificate CA_Cert may be signed with the public key of a root key Root_Key, and the unique asymmetric key certificate DeviceID_Cert may be signed with the public key of a CA key CA_Key, etc. Through such a signing operation, the unique certificate chain 100 may be generated by the certificate authority server 1100A.

The certificate authority server 1100A may inject the unique certificate chain 100 into the electronic device 1300A. The electronic device 1300A may verify the asymmetric key certificate DeviceID_Cert included in the unique certificate chain 100 based on and/or by using the unique asymmetric key DeviceID, etc.

The electronic device 1300A includes the certificate storage unit 1310 (e.g., certificate storage device, etc.), the ROM 1320, a layered storage unit 1330 (e.g., layered storage device, etc.) including the boot loader layer 1331 and/or the firmware layer 1332, a unique information storage unit 1340, a main memory 1350, and/or a controller 1360, etc., but is not limited thereto, and for example, may include a greater or lesser number of constituent components. According to some example embodiments, the certificate storage unit 1310, the ROM 1320, the layered storage unit 1330, the boot loader layer 1331, the firmware layer 1332, the unique information storage unit 1340, the main memory 1350, and/or the controller 1360, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The certificate storage unit 1310 may be implemented with at least one non-volatile memory, etc. For example, the certificate storage unit 1310 may be implemented with EEPROM, a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), and/or a memory similar thereto.

The certificate storage unit 1310 may include one or more slots. In this case, the slot may change and/or store the authority certificate chain 200. For example, the certificate storage unit may store the plurality of authority certificate chains 200 including an owner certificate in each slot. Each of the plurality of slots may referred to as a 0-th slot, a first slot, . . . , and an N-th slot (where N is a natural number).

The ROM 1320 may store a ROM code (e.g., computer readable instructions, etc.). For example, the ROM code may be used by processing circuitry (e.g., the controller 1360, etc.) to generate a unique identifier CDI based on unique information of the electronic device 1300A.

The layered storage unit 1330 may store the boot loader layer 1331 and/or the firmware layer 1332, etc., but is not limited thereto. The layered storage unit 1330 may be implemented with at least one non-volatile memory, etc. For example, the layered storage unit 1330 may be implemented with an EEPROM, a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), and/or a memory similar thereto.

The boot loader layer 1331 may generate a plurality of asymmetric keys based on the unique identifier CDI received from the ROM 1320. For example, the boot loader layer 1331 may generate the unique asymmetric key DeviceID and/or an alias asymmetric key Alias, etc. Additionally, the boot loader layer 1331 may generate an alias asymmetric key certificate Alias_Cert corresponding to the alias asymmetric key Alias. The boot loader layer 1331 may transmit the unique asymmetric key DeviceID, the alias asymmetric key Alias, and/or the alias asymmetric key certificate Alias_Cert to the firmware layer 1332, but is not limited thereto.

The firmware layer 1332 may verify the alias asymmetric key Alias and/or the alias asymmetric key certificate Alias_Cert, etc., received from the boot loader layer 1331.

The main memory 1350, which is at least one volatile memory device, may be provided as a working memory of the electronic device 1300A. For example, the main memory 1350 may be implemented with a dynamic random access memory (DRAM), a static random access memory (SRAM), a mobile DRAM, and/or a memory similar thereto. However, this is an example, and the main memory 1350 may be implemented with, e.g., a non-volatile memory.

The controller 1360 may include at least one processor and may control the overall operation of the electronic device 1300A, but is not limited thereto.

As described in FIG. 2, the electronic device 1300A according to at least one example embodiment of the inventive concepts may generate the unique asymmetric key DeviceID. In addition, the electronic device 1300A may transmit and receive the unique asymmetric key DeviceID and the unique asymmetric key certificate DeviceID_Cert to the certificate authority server 1100. Accordingly, the electronic device 1300A may perform authority authentication of the owner terminal device 1200 based on the unique asymmetric key DeviceID and the unique asymmetric key certificate DeviceID_Cert. The electronic device 1300A according to at least one example embodiment of the inventive concepts may complement and/or improve the authority authentication scheme of the SPDM standard and may provide improved security reliability and/or usability for authority authentication of the owner terminal device 1200.

Figure 3:
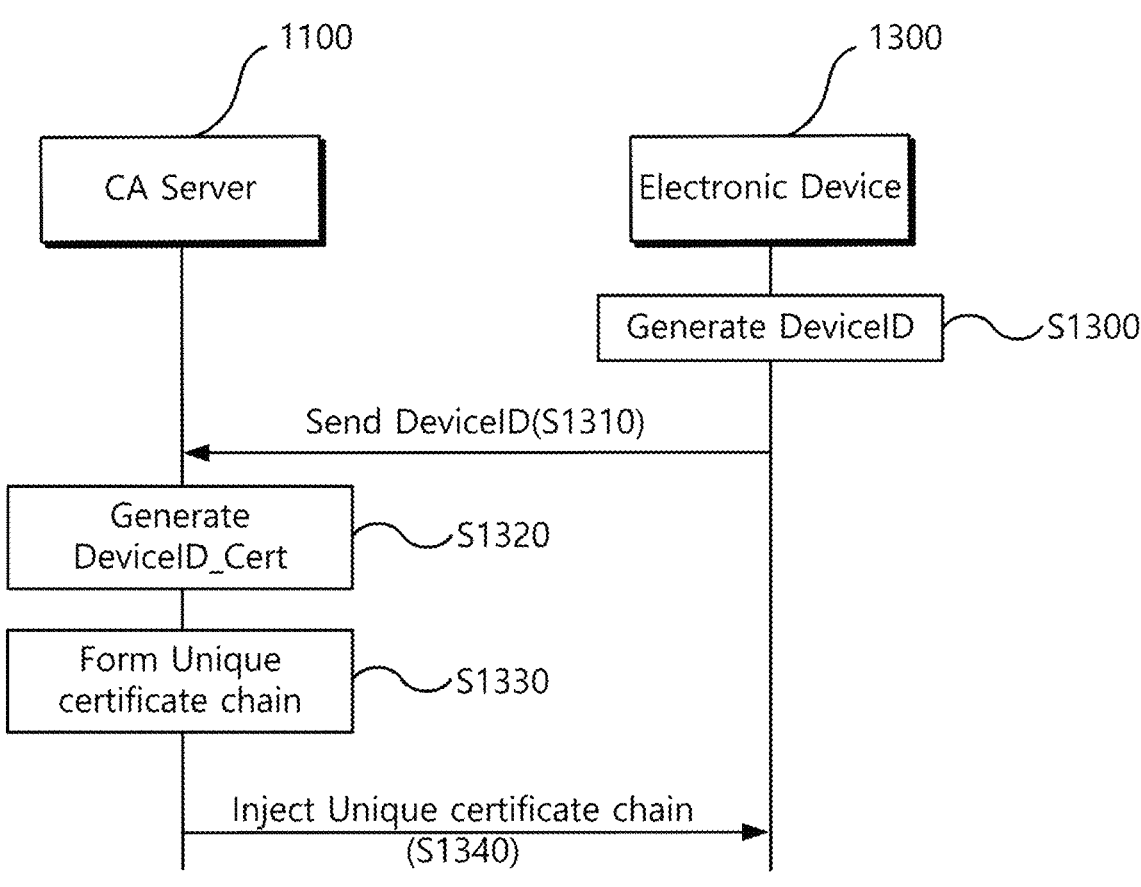
FIG. 3 is a flowchart illustrating an example of the operation of the authority authentication system 1000 of FIG. 1 according to at least one example embodiment.

FIG. 3 is a flowchart illustrating an example of the operation of the authority authentication system 1000 of FIG. 1 according to at least one example embodiment.

Referring to FIG. 3, the unique asymmetric key DeviceID may be generated in operation S1300. For example, the electronic device 1300 of FIG. 1 may generate the unique asymmetric key DeviceID, for example, based on a unique identifier and/or unique information associated with the electronic device 1300. According to at least one example embodiment, the generation of the unique asymmetric key DeviceID by the electronic device 1300 may include generating a private key as the unique asymmetric key DeviceID, and generating a corresponding public key to the unique asymmetric key DeviceID (or vice versa), but the example embodiments are not limited thereto.

In operation S1310, the unique asymmetric key DeviceID may be transmitted to a certificate authority server 1100. For example, the electronic device 1300 may transmit the public key corresponding to the unique asymmetric key DeviceID to the certificate authority server 1100 of FIG. 1.

In operation S1320, the certificate authority server 1100 may generate the unique asymmetric key certificate DeviceID_Cert. For example, the certificate authority server 1100 may generate the unique asymmetric key certificate DeviceID_Cert based on the public key corresponding to the unique asymmetric key certificate DeviceID_Cert.

In operation S1330, the certificate authority server 1100 may generate the unique certificate chain 100 including the unique asymmetric key certificate DeviceID_Cert. For example, the certificate authority server 1100 may generate the unique certificate chain 100 and add and/or append the unique asymmetric key certificate DeviceID_Cert to the unique certificate chain 100.

In operation S1340, the certificate authority server 1100 may inject and/or transmit the unique certificate chain 100 to the electronic device 1300, etc. For example, the certificate authority server 1100 may inject the unique certificate chain 100 into the electronic device 1300, but is not limited thereto. Then, the electronic device 1300 may verify the injected unique certificate chain 100 based on the unique asymmetric key DeviceID, or in other words, the private key corresponding to the public key transmitted to the certificate authority server 1100. According to and/or based on the verification result, the electronic device 1300 may store the unique certificate chain 100 in the electronic device 1300, e.g., the certificate storage unit 1310 of the electronic device 1300, etc.

Figure 4:
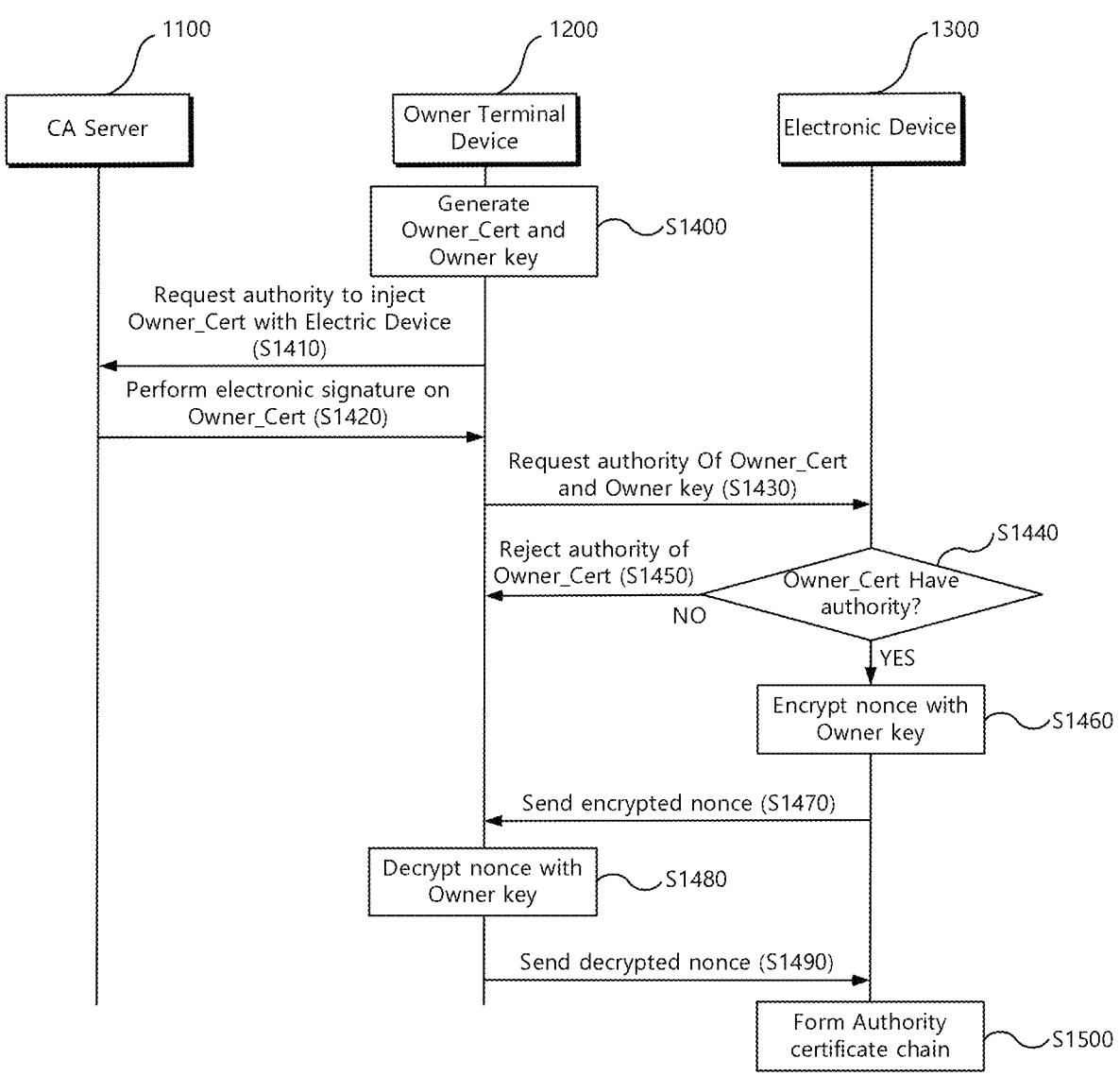
FIG. 4 is a flowchart illustrating an example of the operation of the authority authentication system 1000 of FIG. 1 according to at least one example embodiment.

FIG. 4 is a flowchart illustrating an example of the operation of the authority authentication system 1000 of FIG. 1 according to at least one example embodiment. For the sake of clarity and brevity, it is assumed in FIG. 4 that the owner terminal device 1200 is a device that first requests authority authentication from the electronic device 1300, but the example embodiments are not limited thereto. In addition, it is assumed that the owner terminal device 1200 is a device that has established a trust relationship with the certificate authority server 1100, but the example embodiments are not limited thereto.

Referring to FIG. 4, the owner terminal device 1200 may generate an owner certificate Owner_Cert and/or an owner key in operation S1400. For example, the owner terminal device 1200 of FIG. 1 may generate the owner certificate Owner_Cert and the owner key based on unique information associated with the user of the owner terminal device 1200 and/or the owner terminal device 1200, but the example embodiments are not limited thereto. The owner key may include a key pair including a public key and a secret key associated with the user and/or the owner terminal device 1200.

In operation S1410, the owner terminal device 1200 may request the authority to inject the owner certificate Owner_Cert to the electronic device 1300, or in other words, the owner terminal device 1200 may request access to the electronic device 1300, etc. For example, the owner terminal device 1200 may request authorization for the electronic device 1300, the authorization request including the owner certificate Owner_Cert, to the certificate authority server 1100. That is, the owner terminal device 1200 may request the authority from the certificate authority server 1100 to inject the owner certificate Owner_Cert into the electronic device 1300. In this case, the owner certificate Owner_Cert may include the public key associated with the owner key.

In operation S1420, the certificate authority server 1100 may generate an electronic signature based on the owner certificate Owner_Cert and the unique asymmetric key DeviceID of the electronic device 1300. For example, the certificate authority server 1100 may receive the owner certificate Owner_Cert and the public key of the owner key from the owner terminal device 1200. The certificate authority server 1100 may electronically sign the owner certificate Owner_Cert for the public key of the unique asymmetric key DeviceID, for example the certificate authority server 1100 may electronically sign the owner certificate Owner_Cert for the public key of the unique asymmetric key DeviceID by using a private key of the certificate authority server 1100. In addition, the certificate authority server 1100 may transmit the electronically signed owner certificate Owner_Cert to the owner terminal device 1200.

In operation S1430, the owner terminal device 1200 may request authority authentication of the electronically signed owner certificate Owner_Cert to the electronic device 1300. For example, the owner terminal device 1200 may request authority authentication of the electronically signed owner certificate Owner_Cert from the electronic device 1300. In this case, the owner terminal device 1200 may transmit the public key of the owner key to the electronic device 1300 along with a request for authority authentication, etc.

In operation S1440, the electronic device 1300 may determine whether the electronically signed owner certificate Owner_Cert is authorized based on the unique asymmetric key certificate DeviceID_Cert. For example, the electronic device 1300 may determine whether the received electronically signed owner certificate Owner_Cert is authorized based on the stored unique asymmetric key certificate DeviceID_Cert by verifying the electronically signed owner certificate Owner_Cert with the unique asymmetric key certificate DeviceID_Cert stored on the electronic device 1300. The unique asymmetric key certificate DeviceID_Cert may include information about the certification authority information and the electronic signature of the certificate authority server 1100. Based on the attribute information included in the unique asymmetric key certificate DeviceID_Cert, the electronic device 1300 may determine whether the electronic signature of the owner certificate Owner_Cert was performed by the certificate authority server 1100.

As the determination result, when the electronic device 1300 determines that the owner certificate Owner_Cert is not a valid certificate signed by the certificate authority server 1100, the electronic device 1300 may reject the request for authority authentication in operation S1450. For example, the electronic device 1300 may reject a request for authority authentication from the owner terminal device 1200, and thereby deny and/or prohibit access to the electronic device 1300 from the owner terminal device 1200. In this case, the electronic device 1300 may block the request and access of the rejected owner terminal device 1200.

To the contrary, when the electronic device 1300 determines that the owner certificate Owner_Cert is a certificate validly signed by the certificate authority server 1100, the electronic device 1300 may transmit a challenge to the owner terminal device 1200. The challenge may be a data item transmitted from a verifier to a requester. For example, the requestor may be the owner terminal device 1200, and the verifier may be the electronic device 1300. The electronic device 1300 may generate a random number (and/or a pseudo-random number, a one-time use unique number, etc.) in response to the authority authentication request of the owner terminal device 1200 and encrypt the random number (e.g., a cryptographic nonce) with the owner key of the owner terminal device 1200 in operation S1460. For example, the electronic device 1300 may generate a random number and/or pseudo-random number using conventional methods, etc. The electronic device 1300 may encrypt the random number by using and/or based on the public key of the received owner key. In this case, the random number may be a one-time random numeric data and may be used only once during the authentication process.

In operation S1470, the electronic device 1300 may transmit the encrypted random number to the owner terminal device 1200. For example, the electronic device 1300 may transmit a random number encrypted using the owner key of the owner terminal device 1200 to the owner terminal device 1200. When the owner terminal device 1200 receives the challenge and the encrypted random number, the owner terminal device 1200 may decrypt the encrypted random number using the private key corresponding to the owner key and transmit the unencrypted random number to the electronic device 1300 as a response to the challenge in order to verify that the owner terminal device 1200 was the entity requesting the authority of the electronic device 1300, thereby increasing the security of the system by reducing and/or preventing man-in-the-middle (MITM) type attacks.

In operation S1480, the encrypted random number may be decrypted with the owner key. For example, the owner terminal device 1200 may receive the encrypted random number in response to the above-described challenge. In addition, the owner terminal device 1200 may decrypt the random number with the secret key associated with and/or corresponding to the owner key. In this case, the public key and secret key of the owner key may be a corresponding owner key pair, and data encrypted with the public key of the owner key pair may be decrypted with the secret key of the owner key pair.

In operation S1490, the decrypted random number may be transmitted back to the electronic device 1300 as the response to the challenge. For example, the owner terminal device 1200 may transmit the decrypted random number to the electronic device 1300. Therefore, the electronic device 1300 may verify that the owner terminal device 1200 has the secret key of the owner key pair and verify the owner terminal device 1200 transmitted the authority request. In this case, the number of transmissions of decrypted random numbers may be limited. For example, the electronic device 1300 may limit the number of times the owner terminal device 1200 transmits random numbers. When the number of times a random number is transmitted exceeds a threshold number, the electronic device 1300 may block the request from the owner terminal device 1200. This blocking may decrease and/or prevent brute-force attacks by attackers, thereby increasing the security of the system.

In operation S1500, the electronic device 1300 may generate and/or form an authority certificate chain using the owner certificate Owner_Cert. For example, the electronic device 1300 may verify whether the random number encrypted with the public key of the owner key is the same as the received decrypted random number. When the electronic device 1300 determines that the random numbers are the same, the owner certificate Owner_Cert may be stored in the certificate storage unit 1310 of the electronic device 1300. In addition, the electronic device 1300 may store the owner certificate Owner_Cert and form an authority certificate chain including the owner certificate Owner_Cert. In this case, by storing the signed owner certificate, the authority certificate chain may be automatically formed. Accordingly, the authority certificate chain may include the unique certificate chain and the owner certificate Owner_Cert, but is not limited thereto.

As shown in FIG. 4, the authority authentication system 1000 according to at least one example embodiment of the inventive concepts may encrypt and decrypt a random number by using an owner key and verify the random number. Through such a random number verification process, the reliability of authority authentication for the owner terminal device 1200 may be further improved.

As discussed above, in the authority authentication system 1000 according to at least one example embodiment of the inventive concepts, the electronic device 1300 may directly perform authority authentication for the owner terminal device 1200 without intervention from the certificate authority server 1100. Then, even when the electronic device 1300 does not receive information from and/or does not or cannot communicate with the certificate authority server 1100, the electronic device 1300 may block the access request from an unauthorized owner terminal device 1200. Additionally, the electronic device 1300 may grant and/or change the authority of the owner terminal device 1200 even when the electronic device 1300 does not receive information from and/or does not or cannot communicate with the certificate authority server 1100.

In other words, the certificate authority server 1100 does not need to manage the list and the secret key of an authorized owner terminal device 1200. Accordingly, the electronic device 1300 may easily, efficiently, and/or securely grant access authority to the owner terminal device 1200. Therefore, the authority authentication system 1000 according to at least one example embodiment of the inventive concepts may complement the authority authentication scheme of the SPDM standard and provide improved security reliability for authority authentication of the owner terminal device 1200, etc.

FIGS. 5A and 5B are diagrams illustrating an example of the certificate storage unit 1310 of the electronic device 1300 of FIG. 1 according to at least one example embodiment. For the sake of clarity and brevity, in FIGS. 5A and 5B, it is assumed that the unique certificate chain 100 is formed as a three-layer certificate chain, but the example embodiments are not limited thereto, and the unique certificate chain 100 may have a greater or lesser number of certificate chain layers.

Referring to FIG. 5A, the certificate storage unit 1310 may include the 0-th slot to N-th slots (where N is a natural number). In this case, each slot may store a certificate chain. The certificate chain may include the unique certificate chain 100 and the authority certificate chain 200. For example, an immutable unique certificate chain 100 may be stored in the 0-th slot. That is, the certificate storage unit 1310 may store the unique certificate chain 100 injected by the certificate authority server 1100 in the 0-th slot, but is not limited thereto. Meanwhile, the first to N-th slots may be empty slots, or a variable authority certificate chain 200 may be stored in the first to N-th slots, etc.

The immutable unique certificate chain 100 may be a certificate chain received from the certificate authority server 1100. The unique certificate chain 100 may be formed in three layers including a root certificate Root_Cert, the CA certificate CA_Cert, and the unique asymmetric key certificate DeviceID_Cert, etc., and may be stored in the 0-th slot, but the example embodiments are not limited thereto.

The root certificate Root_Cert may be a certificate of a root CA and may include the public key of the root CA. The certificate Root_Cert of the root CA may be trusted by all entities and is a highest trust level certificate. The CA certificate CA_Cert may be a certificate of a sub-root CA, e.g., a CA this is less trusted and/or has less authority than the root CA. The CA certificate CA_Cert may be signed with the certificate of the root CA, but using an extended key may refer to a certificate that may sign a leaf certificate. The certificate of this sub-root CA may perform a function of protecting and/or improving the security of the authority authentication system 1000 from security risks due to secret key exposure of the root CA.

Referring to FIG. 5B, the authority certificate chain 200 may be stored in the first slot, but is not limited thereto. For example, when the electronic device 1300 assigns and/or grants authority (e.g., access authority, etc.) to the owner terminal device 1200, the electronic device 1300 may store the authority certificate chain in the first slot. In other words, the authority certificate chain 200 including the owner certificate Owner_Cert and the unique certificate chain 100 may be stored in the first slot, but is not limited thereto. For example, the electronic device 1300 may sign the owner certificate Owner_Cert with the public key of the unique asymmetric key DeviceID. Through such a signing process, the owner certificate Owner_Cert may be stored instead of the root certificate Root_Cert of the unique certificate chain 100. For example, because a certificate is injected into the electronic device 1300 from the owner terminal device 1200, the owner certificate Owner_Cert may be stored as the highest level certificate in the electronic device 1300 instead of the root certificate Root_Cert of the unique certificate chain 100. This may be referred to as the authority certificate chain 200.

When the authority certificate chain 200 of the first owner terminal device 1200 is stored in every slot of the certificate storage unit 1310, the authority of an electronic device 1300_1 may be only granted to the first owner terminal device 1200.

The owner terminal device 1200 may request authority authentication from the electronic device 1300 and the request may include slot information. For example, the owner terminal device 1200 may be a device that first requests authority authentication from the electronic device 1300. The owner terminal device 1200 may transmit slot information while requesting authority authentication from the electronic device 1300. The slot information may include request information specifying storage of the authority certificate chain 200 in the first slot. Accordingly, when the electronic device 1300 grants authority to the owner terminal device 1200, the authority certificate chain 200 may be stored in the first slot.

Alternatively, and/or additionally, for example, the owner terminal device 1200 may request authority authentication from the electronic device 1300 without including slot information. In this case, the electronic device 1300 may store the authority certificate chain 200 in any empty slot, if available. In other words, the owner terminal device 1200 may not be interested in having sole access authority to the electronic device 1300 and/or may be interested in sharing access authority to the electronic device 1300 with other owner terminal devices.

As discussed above, in the authority authentication system 1000 according to at least one example embodiment of the inventive concepts, the electronic device 1300 may directly perform authority authentication for the owner terminal device 1200. The certificate authority server 1100 does not need to manage the list and secret key of the authorized owner terminal device 1200, and may easily grant authority to the owner terminal device 1200. Therefore, the authority authentication system 1000 according to at least one example embodiment of the inventive concepts may complement the authority authentication scheme of the SPDM standard and provide improved security reliability for authority authentication of the owner terminal device 1200.

Meanwhile, it may be understood that the above description is illustrative and that the example embodiments of the inventive concepts are not limited thereto. For example, one or more of the example embodiments of the inventive concepts may be applied and modified in various manners. Hereinafter, other example embodiments of the inventive concepts will be described in more detail with reference to the drawings.

FIG. 6 is a diagram illustrating another example of the authority authentication system 1000 of FIG. 1. An authority authentication system 1000_1 of FIG. 6 is similar to the authority authentication system 1000 of FIG. 1. Accordingly, similar or identical components are denoted by similar or identical reference numerals, and overlapping descriptions will be omitted hereinafter.

Referring to FIG. 6, the authority authentication system 1000_1 includes the certificate authority server 1100, a first owner terminal device 1200_1, a second owner terminal device 1200_2, the electronic device 1300_1, and the communication networks 1400_1 and 1400_2, but is not limited thereto. The first owner terminal device 1200_1 and the second owner terminal device 1200_2 have a similar or identical configuration to the owner terminal device 1200 of FIG. 1, but the example embodiments are not limited thereto. In this case, it is assumed that the first owner terminal device 1200_1 is a device that has authority over the electronic device 1300_1. That is, it is assumed that the first authority certificate chain including a first owner certificate Owner_Cert 1 is already stored in a certificate storage unit 1310_1 of the electronic device 1300_1.

The first owner terminal device 1200_1 may generate the first owner certificate Owner_Cert 1 and a first owner key Owner Key 1 (e.g., a first owner key pair including a public owner key and a corresponding private owner key, etc.). In this case, the first owner certificate Owner_Cert 1 may include the public key of the first owner key Owner Key 1. The first owner terminal device 1200_1 may provide and/or send a certificate signing request CSR to the certificate authority server 1100 through the communication network 1400_1. Then, the certificate authority server 1100 may perform an electronic signature on the first owner certificate Owner_Cert 1 in response to the certificate signing request CSR, or in other words, may sign the first owner certificate Owner_Cert 1.

The second owner terminal device 1200_2 may generate a second owner certificate Owner_Cert 2 and a second owner key Owner Key 2 (e.g., a second owner key pair including a public owner key and a corresponding private owner key, etc.). In this case, the second owner certificate Owner_Cert 2 may include the public key of the second owner key Owner Key 2.

The second owner terminal device 1200_2 may provide a certificate signing request CSR for the second owner certificate Owner_Cert 2 to the first owner terminal device 1200_1 through the communication networks 1400_1 and 1400_2. Then, the first owner terminal device 1200_1 may provide an electronic signature to the second owner certificate Owner_Cert 2 of the second owner terminal device 1200_2 (e.g., may electronically sign the second owner certificate Owner_Cert 2) in response to the certificate signing request CSR. In this case, because it is assumed that the first owner terminal device 1200_1 is a device with authority over the electronic device 1300_1, it is assumed that the certificate authority server 1100 has already electronically signed the first owner certificate Owner_Cert 1. Accordingly, the first owner terminal device 1200_1 may perform the electronic signature on the second owner certificate Owner_Cert 2 based on the electronic signature of the first owner certificate Owner_Cert 1. At the same time, the first owner terminal device 1200_1 may transmit the public key of the first owner key Owner Key 1 included in the first owner certificate Owner_Cert 1 to the second owner terminal device 1200_2. In this case, the public key of the first owner key Owner Key 1 may include information electronically signed by the certificate authority server 1100, that is, a signature value associated with the certificate authority server 1100, etc.

The second owner terminal device 1200_2 may transmit an authority authentication request to the electronic device 1300_1. For example, the second owner terminal device 1200_2 may request authority authentication from the electronic device 1300_1 through the communication network 1400_2. At the same time, the second owner terminal device 1200_2 may inject and/or transmit the electronically signed second owner certificate Owner_Cert 2 into the electronic device 1300_1 through the communication network 1400_2. In addition, the second owner terminal device 1200_2 may transmit the public key of the first owner key Owner Key 1 to the electronic device 1300_1. Then, the electronic device 1300_1 may check whether the second owner certificate Owner_Cert 2 is authorized to access the electronic device 1300_1 in response to the authorization request. For example, the electronic device 1300_1 may determine whether the second owner certificate Owner_Cert 2 is authorized based on the first owner certificate Owner_Cert 1 and/or the first authority certificate chain. In addition, the electronic device 1300_1 may determine whether the public key of the received first owner key Owner Key 1 is the same as the public key included in the stored first owner certificate Owner_Cert 1 stored in the electronic device 1300_1.

When the electronic device 1300_1 grants authority to the second owner terminal device 1200_2, the authority certificate chain may be changed. For example, the first authority certificate chain including the first owner certificate Owner_Cert 1 may be overwritten with the second authority certificate chain including the second owner certificate Owner_Cert 2, but the example embodiments are not limited thereto.

As discussed above, in the authority authentication system 1000 according to at least one example embodiment of the inventive concepts, the electronic device 1300_1 may directly perform authority authentication of the owner terminal device 1200. Then, the electronic device 1300_1 may grant and/or change authority to the owner terminal device 1200 even when information is not received from the certificate authority server 1100. In addition, the owner terminal devices 1200 may directly perform an electronic signature without the electronic signature of the certificate authority server 1100 for the certificate. Therefore, the certificate authority server 1100 according to at least one example embodiment of the inventive concepts does not need to manage the list and secret key of the authorized owner terminal device 1200. Accordingly, the electronic device 1300_1 may simply and quickly grant authority to the owner terminal device 1200. In addition, the authority authentication system 1000 of the at least one example embodiment of the inventive concepts may complement the authority authentication scheme of the SPDM standard and provide improved security reliability for authority authentication of the owner terminal device 1200, etc.

FIG. 7 is a flowchart illustrating another example of the operation of the authority authentication system 1000_1 of FIG. 6 according to at least one example embodiment. For example, operations S1410' and S1420' of FIG. 7 may correspond to operations S1410 and S1420 of FIG. 4, but the example embodiments are not limited thereto.

Referring to FIG. 7, the second owner certificate Owner_Cert 2 and the second owner key Owner Key 2 may be generated by the second owner terminal device 1200_2 in operation S1700. For example, the second owner terminal device 1200_2 of FIG. 6 may generate the second owner certificate Owner_Cert 2 and the second owner key Owner Key 2 (e.g., the second owner key pair, etc.).

In operation S1710, the second owner terminal device 1200_2 may transmit a request authority to inject the second owner certificate Owner_Cert 2 to the first owner terminal device 1. For example, the second owner terminal device 1200_2 may request authority authentication for the electronic device 1300_1 together with the second owner certificate Owner_Cert 2 from the first owner terminal device 1200_1 of FIG. 6. In other words, the second owner terminal device 1200_2 may request authority from the first owner terminal device 1200_1 to inject the second owner certificate Owner_Cert 2 into the electronic device 1300_1.

In operation S1720, an electronic signature may be performed by the first owner terminal device 1 on the second owner certificate Owner_Cert 2 based on the first owner certificate Owner_Cert 1. For example, the first owner terminal device 1200_1 may receive the second owner certificate Owner_Cert 2 and the public key of the second owner key Owner Key 2 from the second owner terminal device 1200_2. The first owner terminal device 1200_1 may electronically sign the second owner certificate Owner_Cert 2 by using the stored signature information of the first owner certificate Owner_Cert 1. In this case, it is assumed that the first owner certificate Owner_Cert 1 is a certificate on which the certificate authority server 1100 has performed an electronic signature. Accordingly, the signature information of the first owner certificate Owner_Cert 1 may be the signature value of the certificate authority server 1100. In addition, the first owner terminal device 1200_1 may transmit the electronically signed second owner certificate Owner-_Cert 2 and the public key of a first owner Owner Key 1 to the second owner terminal device 1200_2.

In operation S1730, the second owner terminal device 1200_2 may transmit the electronically signed second owner certificate Owner_Cert 2 and the second owner key Owner Key 2 to the electronic device 1300_1. For example, the second owner terminal device 1200_2 may request authority authentication of the electronically signed second owner certificate Owner_Cert 2 from the electronic device 1300_1. In this case, the second owner terminal device 1200_2 may transmit the public key of the second owner key Owner Key 2 to the electronic device 1300_1 together with the authority authentication request. In addition, the second owner terminal device 1200_2 may transmit the public key of the first owner Owner Key 1 to the electronic device 1300_1.

In operation S1740, the electronic device 1300_1 may determine whether the second owner certificate Owner_Cert 2, which is electronically signed, is authorized based on the first owner certificate Owner_Cert 1. For example, the electronic device 1300_1 may receive the electronically signed second owner certificate Owner_Cert 2. Then, the electronic device 1300_1 may determine whether the electronically signed second owner certificate Owner_Cert 2 is authorized based on the pre-stored first owner certificate Owner_Cert 1, etc. Based on the attribute information included in the first owner certificate Owner_Cert 1, the electronic device 1300_1 may determine whether the electronic signature of the second owner certificate Owner_Cert 2 is performed by the first owner terminal device 1200_1. Alternatively, and/or additionally, the electronic device 1300_1 may determine whether the second owner certificate Owner_Cert 2 is authorized based on the first owner certificate Owner_Cert 1 and/or the first authority certificate chain, etc. In addition, the electronic device 1300_1 may determine whether the public key of the received first owner key Owner Key 1 is the public key included in the stored first owner certificate Owner_Cert 1, etc.

As the determination result, when the electronic device 1300_1 determines that the second owner certificate Owner_Cert 2 is not a certificate signed by the first owner terminal device 1200_1, the request for authority authentication may be rejected and/or denied in operation S1750. For example, the electronic device 1300_1 may reject a request for authority authentication from the second owner terminal device 1200_2 in response to determining that the second owner certificate Owner_Cert 2 was not signed by the first owner terminal device 1200_1. In this case, the electronic device 1300_1 may block the request and/or access attempt of the rejected second owner terminal device 1200_2.

Additionally, when the electronic device 1300_1 determines that the second owner certificate Owner_Cert 2 is signed by the first owner terminal device 1200_1, the electronic device 1300_1 may encrypt a random number (e.g., a cryptographic nonce value, etc.) with the second owner key Owner Key 2 in operation S1760. For example, the electronic device 1300_1 may generate a random number and/or a pseudo-random number, etc., as the nonce value to be encrypted. The electronic device 1300_1 may encrypt the random number (and/or pseudo-random number, etc.) with the public key of the second owner key Owner Key 2.

In operation S1770, the electronic device 1300_1 may transmit the encrypted random number to the second owner terminal device 1200_2. For example, the electronic device 1300_1 may transmit the encrypted random number to the second owner terminal device 1200_2.

In operation S1780, the second owner terminal device 1200_2 may decrypt the encrypted random number with the second owner key Owner Key 2. For example, the second owner terminal device 1200_2 may receive the encrypted random number and decrypt the random number with the secret key of the second owner key Owner Key 2.

In operation S1790, the second owner terminal device 1200_2 may transmit the decrypted random number. For example, the owner terminal device 1200 may transmit the decrypted random number back to the electronic device 1300_1. Accordingly, the electronic device 1300_1 may determine that the second owner terminal device 1200_2 has the secret key of the second owner key Owner Key 2.

In operation S1800, the electronic device 1300_1 may overwrite the stored authority certificate chain, but is not limited thereto. For example, the electronic device 1300_1 may verify whether the random number encrypted with the public key of the second owner key Owner Key 2 is the same as the received random number. When the electronic device 1300_1 determines that the random numbers are the same, the second owner certificate Owner_Cert 2 may be stored in the certificate storage unit 1310_1. In addition, the electronic device 1300_1 may overwrite the first authority certificate chain including the first owner certificate Owner_Cert 1 with the second authority certificate chain including the second owner certificate Owner_Cert 2. In this case, the second authority certificate chain may include the unique certificate chain and the second owner certificate Owner_Cert 2, etc.

As shown in FIG. 7, the authority authentication system 1000 according to at least one example embodiment of the inventive concepts may encrypt and decrypt a random number with an owner key and verify the random number in order to verify the identity of the second owner terminal device 1200_2 and/or to verify that the authorization request was transmitted by the second owner terminal device 1200_2 and not a malicious actor impersonating the second owner terminal device 1200_2. Through such a verification process, the authority authentication system 1000 of the example embodiments of the inventive concepts may further improve the security and/or the reliability of authority authentication for the plurality of owner terminal devices 1200_1 and 1200_2.

As discussed above, in the authority authentication system 1000 according to at least one example embodiment of the inventive concepts, the electronic device 1300_1 may directly perform authority authentication of the owner terminal device 1200 without interaction of the certificate authority server 1100. Then, the electronic device 1300_1 may grant and/or change authority to the owner terminal device 1200 even when information is not received from the certificate authority server 1100. In addition, the owner terminal devices 1200 may directly perform an electronic signature without the electronic signature of the certificate authority server 1100 for the certificate. Therefore, the authority authentication system 1000 according to at least one example embodiment of the inventive concepts does not need to manage the list and secret key of the authorized owner terminal device 1200. Accordingly, the electronic device 1300_1 may simply and quickly grant authority to the owner terminal device 1200. Additionally, the authority authentication system 1000 may complement the authority authentication scheme of the SPDM standard and provide improved security reliability for authority authentication of the owner terminal device 1200.

FIGS. 8A and 8B are diagrams illustrating another example of the certificate storage unit 1310_1 of FIG. 6 according to at least one example embodiment. The certificate storage unit 1310_1 in FIGS. 8A and 8B is similar to the certificate storage unit 1310 in FIGS. 5A and 5B, but is not limited thereto. Accordingly, similar or identical components are denoted by similar or identical reference numerals, and overlapping descriptions will be omitted hereinafter.

Referring to FIG. 8A, an immutable unique certificate chain 100 may be stored in the 0-th slot. In addition, the first authority certificate chain 200 may be formed and stored in the first slot. It is assumed that the first authority certificate chain 200 and the second authority certificate chain 200' include at least one owner certificate Owner_Cert, but the example embodiments are not limited thereto. For example, the first authority certificate chain 200 stored in the first slot may include the first owner certificate Owner_Cert 1 and the N-th owner certificate Owner_Cert N, etc. Then, the first authority certificate chain 200 may be the authority certificate chain 200 for not only the first owner terminal device 1200_1 but also the N-th owner terminal device 1200_N.

Referring to FIG. 8B, the second authority certificate chain 200' may be formed and stored in the first slot, but is not limited thereto. For example, when the electronic device 1300_1 grants authority to the second owner terminal device 1200_2, the electronic device 1300_1 may change the first authority certificate chain 200 previously stored in the first slot. For example, when the electronic device 1300_1 grants authority to the second owner terminal device 1200_2, the electronic device 1300_1 may store the second owner certificate Owner_Cert 2 instead of the first owner certificate Owner_Cert 1 of the first authority certificate chain 200, but is not limited thereto. The electronic device 1300_1 may change the stored and/or pre-stored first authority certificate chain 200 by replacing and storing the second owner certificate Owner_Cert 2. The authority certificate chain changed in the first slot through such a process may be referred to as the second authority certificate chain 200'. As described above, the electronic device 1300_1 may overwrite the first authority certificate chain 200 with the second authority certificate chain 200' in the first slot.

The second owner terminal device 1200_2 may request authority authentication from the electronic device 1300_1 and the request may include slot information. For example, the second owner terminal device 1200_2 may transmit slot information while requesting authority authentication from the electronic device 1300_1. In this case, the slot information, which is information transmitted from the first owner terminal device 1200_1 to the second owner terminal device 1200_2, may be location information of the slot in which the first authority certificate chain 200 is stored. That is, the slot information may be information specifying to change the first authority certificate chain 200 stored in the 'first slot' to the second authority certificate chain 200'. Alternatively, and/or additionally, for example, the slot information may include information related to the public key of the second owner terminal device 1200_2 and/or the second owner certificate Owner_Cert 2 signed with the public key of the first owner terminal device 1200_1. Accordingly, the electronic device 1300_1 may confirm that the second owner terminal device 1200_2 is a terminal device that has received authority for the electronic device 1300_1 from the first owner terminal device 1200_1, etc.

As a more specific example, the second owner terminal device 1200_2 may transmit slot information including the 'first slot' to the electronic device 1300_1. Then, the electronic device 1300_1 may check whether the slot in which the first authority certificate chain 200 is stored is the 'first slot'. Because the slot information transmitted by the second owner terminal device 1200_2 matches the slot information in which the first authority certificate chain 200 is stored, the electronic device 1300_1 may change the first authority certificate chain 200 stored in the first slot to the second authority certificate chain 200'. That is, the electronic device 1300_1 may overwrite the first authority certificate chain 200 previously stored in the first slot with the second authority certificate chain 200' based on the verification of the slot information, etc.

Meanwhile, when the slot information transmitted by the second owner terminal device 1200_2 and the information about a slot in which the first authority certificate chain 200 is stored do not match, the electronic device 1300_1 does not change the first authority certificate chain 200 stored in the first slot to the second authority certificate chain 200' and rejects the authority authentication request.

As shown in FIGS. 8A and 8B, the electronic device 1300_1 according to at least one example embodiment of the inventive concepts may improve and/or increase the reliability of authority authentication of the owner terminal device 1200 by additionally verifying whether the slot information matches. In addition, the electronic device 1300_1 may delete and/or change the first authority certificate chain 200 as desired and/or needed even when it is invalid. In other words, the electronic device 1300_1 may easily, quickly, efficiently, and securely change the authority certificate chain 200 without additional procedures.

FIGS. 9A and 9B are diagrams illustrating still another example of the certificate storage unit 1310_1 of FIG. 6 according to at least one example embodiment. The certificate storage unit 1310_2 in FIGS. 9A and 9B is similar to the certificate storage unit 1310 in FIGS. 8A and 8B, but is not limited thereto. Accordingly, similar and/or identical components are denoted by similar and/or identical reference numerals, and overlapping descriptions will be omitted hereinafter. For the sake of clarity and brevity, in FIGS. 9A and 9B, it is assumed that the unique certificate chain is formed as a three-layer certificate chain, but the example embodiments are not limited thereto.

Referring to FIG. 9A, the immutable unique certificate chain 100 may be stored in the 0-th slot, but is not limited thereto. The unique certificate chain 100 may be formed in three layers including the root certificate Root_Cert, the CA certificate CA_Cert, and the unique asymmetric key certificate DeviceID_Cert, and may be stored in the 0-th slot.

As shown in FIG. 9A, it is assumed that a certificate chain is stored in the first slot and the storage space of the Nth slot is empty. In this case, it is assumed that the electronic device 1300_1 stores the certificate chain in the first slot. It is assumed that the certificate chain stored in the first slot includes a second owner certificate Owner_Cert 2 and an N-th owner certificate Owner_Cert N. However, the example embodiments are not limited thereto.

Referring to FIG. 9B, the first authority certificate chain 200 may be stored in the N-th slot which is empty. For example, the first owner terminal device 1200_1 may request authority authentication from the electronic device 1300_1 with or without slot information. In this case, it is assumed that the first owner terminal device 1200_1 is the same or similar trusted subject as the certificate authority server 1100 for the electronic device 1300_1. For example, it is assumed that the first owner certificate Owner_Cert 1 of the first owner terminal device 1200_1 is directly signed by the certificate authority server 1100.

The electronic device 1300_1 may receive a value (e.g., a nonce value, etc.) signed by the certificate authority server 1100 on the first owner certificate Owner_Cert 1 from the first owner terminal device 1200_1. Then, the electronic device 1300_1 may determine that the first owner terminal device 1200_1 is a subject (e.g., a terminal device, etc.) which has been validated and has received authority permission from the certificate authority server 1100.

The first owner terminal device 1200_1 may transmit a 'first slot' while requesting authority authentication from the electronic device 1300_1. Then, the electronic device 1300_1 may check whether its 'first slot' is empty. Alternatively, and/or additionally, the first owner terminal device 1200_1 may not transmit slot information. Then, the electronic device 1300_1 may check and/or determine the location of an empty slot.

As shown in FIG. 9B, the certificate chain is stored in the first slot. In this case, the electronic device 1300_1 may determine whether the slot information requested by the first owner terminal device 1200_1 is inconsistent. Then, the electronic device 1300_1 may determine whether the first owner terminal device 1200_1 is a subject which has received authority permission from the certificate authority server 1100. In this case, when the root certificate Root_Cert and the CA certificate CA_Cert of the certificate authority server 1100 are present in the 0-th slot, the electronic device 1300_1 may store the first authority certificate chain 200 in the N-th slot which is empty. In this case, the first authority certificate chain 200 may include the first owner certificate Owner_Cert 1 and may or may not include the unique certificate chain 100, etc.

As shown in FIGS. 9A and 9B, the electronic device 1300_1 according to at least one example embodiment of the inventive concepts may improve the reliability of authority authentication of the owner terminal device 1200 by additionally verifying whether the slot information matches.

As discussed above, in the authority authentication system 1000 according to at least one example embodiment of the inventive concepts, the electronic device 1300 may directly perform authority authentication of the owner terminal device 1200. Then, the electronic device 1300 may not receive information from the certificate authority server 1100, and may block and/or prohibit the request from the unauthorized owner terminal device 1200. Additionally, the electronic device 1300 may not receive information from and/or may not communicate with the certificate authority server 1100, e.g., due to the certificate authority server 1100 being offline, the electronic device 1300 not having network connectivity, etc., and may grant the authority of the owner terminal device 1200. In other words, the certificate authority server 1100 does not need to manage the list and secret key of the owner terminal device 1200 with authority. Accordingly, the electronic device 1300 may easily, quickly, efficiently, and/or securely grant authority to the owner terminal device 1200 even without interaction with the certificate authority server 1100, etc. Therefore, the authority authentication system 1000 according to at least one example embodiment of the inventive concepts may complement and/or enhance the authority authentication scheme of the SPDM standard and provide improved security reliability and usability for authority authentication of the owner terminal device 1200.

Meanwhile, various example embodiments have been described above. The example embodiments of the inventive concepts may include not only the above-described example embodiments, but also simple design changes or easily changeable example embodiments. In addition, the inventive concepts may include techniques that can easily modify and implement the example embodiments. Therefore, the scope of the inventive concepts should not be limited to the above-described example embodiments, but should be defined by the claims described below as well as the claims and equivalents.

What is claimed is:

1. An authority authentication system comprising:
an electronic device configured to generate a first unique asymmetric key pair, including a first public key and a first private key;
a certificate authority computer configured to generate a unique asymmetric key certificate and a unique certificate chain, and inject the unique certificate chain into the electronic device;
at least one owner terminal computer configured to request authority authentication from the electronic device based on at least one owner certificate and at least one owner key pair corresponding to the at least one owner terminal computer, the at least one owner key pair including at least one public owner key and at least one private owner key; and
a communication network including a secure communication channel configured to transmit and receive the at least one owner certificate and the at least one public owner key,
wherein the electronic device is further configured to,
form an authority certificate chain including the unique certificate chain and the at least one owner certificate; and
change the authority certificate chain based on authentication of an authority of the at least one owner terminal computer.

2. The authority authentication system of claim 1, wherein the electronic device includes:
memory including at least one slot configured to store the authority certificate chain; and
processing circuitry configured to,
generate a unique identifier associated with the electronic device,
generate the first unique asymmetric key pair based on the unique identifier, and verify the unique certificate chain including the unique asymmetric key certificate based on the first private key.

3. The authority authentication system of claim 2, wherein the memory includes:
a 0-th slot configured to store an immutable unique certificate chain; and
a first slot configured to store a variable authority certificate chain.

4. The authority authentication system of claim 3, wherein the certificate authority computer is further configured to:
receive the first public key; and
electronically sign the at least one owner certificate for the first public key.

5. The authority authentication system of claim 4, wherein the electronic device is further configured to:
receive the electronically signed at least one owner certificate and the at least one public owner key;
determine whether the at least one owner terminal computer has authority based on the unique asymmetric key certificate;
encrypt a nonce number with the at least one public owner key based on results of the determination; and
transmit the encrypted nonce number to the at least one owner terminal computer.

6. The authority authentication system of claim 5, wherein the at least one owner terminal computer is further configured to:
decrypt the encrypted nonce number with the at least one private owner key; and
transmit the decrypted nonce number to the electronic device.

7. The authority authentication system of claim 6, wherein the electronic device is further configured to:
verify the decrypted nonce number with the nonce number; and
based on results of the verification of the decrypted nonce number, store the at least one owner certificate in the memory and change the authority certificate chain stored in the memory.

8. The authority authentication system of claim 4, wherein the at least one owner terminal computer includes:
a first owner terminal computer configured to generate a first owner certificate and a first owner key pair;
a second owner terminal computer configured to generate a second owner certificate and a second owner key pair, the second owner key pair including a second private owner key and a second public owner key,
wherein the first owner terminal computer is further configured to electronically sign the second owner certificate based on the first owner certificate electronically signed by the certificate authority computer; and
wherein the second owner terminal computer is further configured to request authority authentication to be performed by the electronic device by transmitting the electronically signed second owner certificate and the second public owner key to the electronic device.

9. The authority authentication system of claim 8, wherein the electronic device is further configured to:
change the authority certificate chain in response to successfully authorizing the second owner terminal computer, the changing the authority certificate chain including,
overwriting a first authority certificate chain including the first owner certificate with a second authority certificate chain including the second owner certificate.

10. The authority authentication system of claim 9, wherein the second owner terminal computer is further configured to request authority authentication from the electronic device by transmitting slot information in which the first authority certificate chain is stored to the electronic device; and the electronic device is further configured to verify the slot information, and replace the first authority certificate chain with the second authority certificate chain based on results of the verification of the slot information.

11. The authority authentication system of claim 10, wherein the electronic device is further configured to:

replace the first authority certificate chain with the second authority certificate chain in response to determining that the slot information is correct; and determine whether the second owner terminal computer has authority based on the unique certificate chain stored in the 0-th slot in response to determining that the slot information is incorrect.

12. The authority authentication system of claim 2, wherein the memory and the processing circuitry are manufactured based on a device identifier composition engine (DICE) standard.

13. The authority authentication system of claim 1, wherein the secure communication channel is a secure communication session using a security protocol and data model (SPDM) standard.

14. An electronic device comprising:

memory including a plurality of slots configured to store a unique certificate chain including a unique asymmetric key certificate, the plurality of slots including a 0-th slot configured to store an immutable unique certificate chain, and a first slot configured to store a variable authority certificate chain; and processing circuitry configured to, generate a unique identifier associated with the electronic device;

generate a unique asymmetric key pair based on the unique identifier, the unique asymmetric key pair including a first public key and a first private key;

verify the unique certificate chain based on the first private key-;

receive an authority authentication request from an owner terminal computer, the authority authentication request including an owner certificate and a public owner key associated with the owner terminal computer;

form an authority certificate chain including the owner certificate and the unique certificate chain; and change the authority certificate chain in response to results of the authority authentication request.

15. An authority authentication method comprising:

generating, using processing circuitry, a unique asymmetric key pair, the unique asymmetric key pair including a first public key and a first private key;

transmitting, using the processing circuitry, the first public key to a certificate authority computer;

receiving, using the processing circuitry, a unique certificate chain including a unique asymmetric key certificate generated based on the first public key;

receiving, using the processing circuitry, an authority authentication request from an owner terminal computer, the authority authentication request including an owner certificate and a public owner key associated with the owner terminal computer;

forming, using the processing circuitry, an authority certificate chain including the owner certificate and the unique certificate chain; and changing, using the processing circuitry, the authority certificate chain in response to results of the authority authentication request.

16. The authority authentication method of claim 15, wherein the owner certificate for the first public key is electronically signed by the certificate authority computer;

the authority authentication request includes the electronically signed owner certificate; and the method further comprises, determining whether the electronically signed owner certificate is authorized, based on the unique asymmetric key certificate.

17. The authority authentication method of claim 16, wherein the forming of the authority certificate chain includes:

encrypting a nonce number with the public owner key associated with the owner terminal computer based on results of the determination of the authority of the electronically signed owner certificate;

transmitting the encrypted nonce number to the owner terminal computer, the transmitting causing the owner terminal computer to decrypt the encrypted nonce number with a private owner key associated with the owner terminal computer;

receiving the decrypted nonce number from the owner terminal computer;

determining whether the decrypted nonce number matches the nonce number;

storing the owner certificate according to results of the determination of whether the decrypted nonce number matches; and forming the authority certificate chain based on the stored owner certificate.

18. The authority authentication method of claim 17, wherein the owner certificate is a first owner certificate associated with a first owner terminal computer; and the first owner terminal computer is configured to electronically sign a second owner certificate associated with a second terminal computer, based on the electronically signed first owner certificate.

19. The authority authentication method of claim 18, wherein the changing of the authority certificate chain further includes:

receiving a second authority authentication request from a second owner terminal computer, the second authority authentication request including the electronically signed second owner certificate;

determining whether the electronically signed second owner certificate is authorized, based on the first owner certificate;

encrypting a second nonce number using a second public owner key associated with the second owner terminal computer in response to the authorized second authority authentication request;

transmitting the encrypted second nonce number to the second owner terminal computer, the transmitting causing the second owner terminal computer to decrypt the encrypted second nonce number using a second private owner key associated with the second owner terminal computer;

receiving the decrypted second nonce number from the second owner terminal computer;

determining whether the decrypted second nonce number matches the second nonce number; and changing the authority certificate chain based on results of the determination of whether the decrypted second nonce number matches.

20. The authority authentication method of claim 19, wherein the changing of the authority certificate chain includes:

overwriting a first authority certificate chain including the first owner certificate with a second authority certificate chain including the second owner certificate.

\* \* \* \* \*